Patented Nov. 6, 1928.

1,690,325

UNITED STATES PATENT OFFICE.

MAX BOCKMÜHL AND GUSTAV EHRHART, OF HOCHST-ON-THE-MAIN, GERMANY, ASSIGNORS, BY MESNE ASSIGNMENTS, TO WINTHROP CHEMICAL COMPANY, OF NEW YORK, N. Y., A CORPORATION OF NEW YORK.

PROCESS OF PRODUCING ALKYLATED ALIPHATIC NITRILES.

No Drawing. Application filed June 17, 1926, Serial No. 116,727, and in Germany June 22, 1925.

The present invention relates to a process of producing tertiary nitriles.

Now we have found that secondary nitriles are capable of forming alkali compounds which, when treated with an alkylating agent, are converted into tertiary nitriles. For this purpose the secondary nitriles are first transformed into the corresponding alkali metal compounds by means of an alkali metal or an alkali metal amide which latter are then treated with an alkylating agent. In the reaction there may be used a solvent, but it also takes place without a solvent. There may also be employed an excess of the secondary nitrile in which case the secondary nitrile acts as a solvent.

Our process provides a new way of preparing tertiary alkylated acid-amides. These compounds heretofore were only obtained by a rather complicated process (see for instance Haller Comptes Rendus Vol. 148, page 127). The Haller process, however, gives absolutely unsatisfactory yields. Moreover, our new direct method of preparing alkylated acid-amides involves a considerable improvement over the process described and claimed in U. S. Patent No. 1,482,343 of January 29, 1924.

The following examples serve to illustrate our invention but are not intended to limit it thereto:

1. 10 parts by weight of diethylacetonitrile dissolved in 30 parts by volume of dry ether are gradually mixed, while stirring and heating, under reflux with 4 parts of potassium. Thereupon evolution of hydrogen sets in and the potassium passes slowly into solution. After three hours, any small amount of potassium which may have remained unattacked is sifted off. The potassium-nitrile is then mixed with 12 parts of allyl bromide, whereby the ether begins to boil and potassium bromide separates. The resulting mass is heated for another hour, filtered off and the filtrate, after having distilled off the ether, is subjected to distillation in a vacuum. Thus diethylallylacetonitrile, distilling over at 78° under 9 mm. pressure, is obtained. By subsequent saponification the diethylallylacetamide, having its melting point at 74°, is obtained. The process of this example is shown in the following equation:

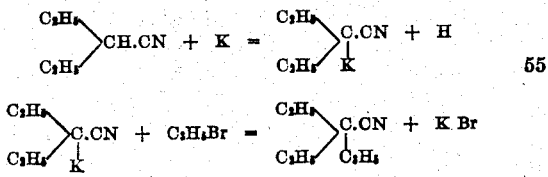

2. 20 parts by weight of diethylacetonitrile dissolved in 200 parts by volume of dry benzol are mixed under the conditions indicated in Example 1 with 8 parts of potassium. A lively reaction sets in so that all the potassium is consumed already in an hour's time, whereupon 24 parts of allyl bromide are added. The further operations are carried out as indicated in the foregoing example, the resulting product being diethylallylacetonitrile of the same boiling point.

3. 20 parts by weight of diethylacetonitrile dissolved in 100 parts of xylene are mixed as indicated above, while stirring and heating, with 5 parts of sodium. After three hours, the resulting mass is allowed to cool and then mixed with 24 parts of allyl bromide dissolved in 30 parts of xylene. The whole is then slowly heated and finally boiled for another three hours. The further operations are carried out as above specified.

4. 20 parts by weight of diethylacetonitrile are treated as specified in Example 1 with 8 parts of potassium and 35 parts of benzyl bromide. The boiling point of the diethylbenzylacetonitrile thus obtained lies under 1 mm. pressure at 120–122° C. On saponifying the nitrile with alcoholic potassium the amide having its melting point at 75° C. is obtained.

5. 26 grams of sodium in 200 grams of diethylacetonitrile are transformed into the sodium salt of diethylacetonitrile. After having diluted the product with ether, 200 grams of ethyl bromide are run in. After having worked up the reaction product there are obtained 80 grams of triethylacetonitrile distilling over under 10 mm. pressure at 60–64° C.

6. 25 grams of isopropylethylacetonitrile dissolved in 100 cc. of benzene are mixed with a small quantity of potassium until a total of 8.5 grams are introduced. Thus, the potassium isopropylethylacetonitrile is formed with a lively evolution of hydrogen. The product is well cooled and there are then added by drops 28 grams of allyl bromide diluted with 30 cc. of benzene. The product thus obtained, after being worked up in the manner above specified, yields 15 grams of isopropylethylallylacetonitrile distilling over at 78–81° C. under 7 mm. pressure.

7. 12.1 grams of diallylacetonitrile are introduced by drops into a fine suspension of 3.9 grams of potassium in 100 cc. of absolute ether. When the potassium has totally disappeared, the remaining mass is boiled for half an hour and cooled, whereupon 12.5 grams of allylbromide are slowly added. The potassium bromide separates and the ether assumes a dark color. When the reaction is complete, the mixture is poured on ice, the layer of ether is taken off, neutralized and dried. The triallylacetonitrile thus obtained boils at a temperature between 100–120° C. under 4 mm. pressure.

The diallylacetonitrile used as parent material is obtained by allylating the known monoallylcyanoacetic ester (see Beilstein 4, Vol. II, page 776) saponifying the resulting diallylcyanoacetic ester and distilling the diallylcyanoacetic acid. Boiling point of the diallylcyanoacetic ester 115–120° (pressure 12 mm.). Boiling point of diallylacetonitrile 73° (pressure 12 mm.).

8. 3000 parts by weight of diethylacetonitrile are converted by means of 525 parts by weight of sodium into the corresponding sodium nitrile compound and are caused to be acted upon by 1500 parts by weight of allylchloride. The reaction product is worked up as usual and 1050 parts by weight of diethylallylacetonitrile are obtained.

9. 200 parts by weight of diethylacetonitrile are converted by means of 34 parts by weight of sodium into the corresponding sodium nitrile compound as described above. The reaction mixture thus obtained is diluted with ether and 115 parts by weight of diethylsulfate are added, thereby 100 parts by weight of triethylacetonitrile are obtained with the melting point of 155 to 160° C.

We claim:

1. The process of producing tertiary nitriles which consists in treating a secondary nitrile of the general formula:

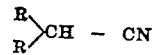

wherein R stands for an alkyl residue, with an alkali metal and then causing an alkylating agent to act upon the alkali metal compound of the secondary nitrile thus obtained.

2. The process of producing tertiary nitriles which consists in treating a secondary nitrile of the general formula:

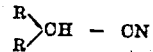

wherein R stands for an alkyl residue, with an alkali metal and then causing an alkylating agent to act upon the alkali metal compound of the secondary nitrile thus obtained, the reaction taking place in the presence of a solvent.

3. The process of producing tertiary nitriles which consists in treating a secondary nitrile of the general formula:

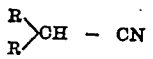

wherein R stands for an alkyl residue, with an alkali metal and then causing an alkylating agent to act upon the alkali metal compound of the secondary nitrile thus obtained, the reaction taking place in the presence of an excess of the nitrile as a solvent.

4. The process of producing tertiary nitriles which consists in treating the secondary nitrile of the formula:

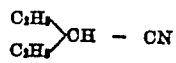

with an alkali metal and then causing an alkylating agent to act upon the alkali metal compound thus obtained.

5. The process of producing tertiary nitriles which consists in treating a secondary nitrile of the general formula:

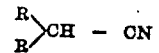

wherein R stands for an alkyl residue, with an alkali metal and then causing an alkyl halogenide to act upon the alkali metal compound of the secondary nitrile thus obtained.

6. The process of producing tertiary nitriles which consists in treating a secondary nitrile of the general formula:

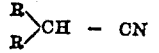

wherein R stands for an alkyl residue, with an alkali metal and then causing an alkyl halogenide to act upon the alkali metal compound of the secondary nitrile thus obtained, the reaction taking place in the presence of a solvent.

7. The process of producing tertiary nitriles which consists in treating a secondary nitrile of the general formula:

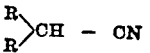

wherein R stands for an alkyl residue, an alkali metal and then causing an alkyl halogenide to act upon the alkali metal compound of the secondary nitrile thus obtained, the reaction taking place in the presence of an excess of the nitrile as solvent.

8. The process of producing tertiary nitriles which consists in treating the secondary nitrile of the formula:

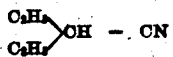

with an alkali metal and then causing an alkyl halogenide to act upon the alkali metal compound thus obtained.

In testimony whereof, we affix our signatures.

Dr. MAX BOCKMÜHL.
Dr. GUSTAV EHRHART.